United States Patent [19]
Bosio

[11] Patent Number: 6,027,007
[45] Date of Patent: Feb. 22, 2000

[54] DEVICE FOR INTERNALLY WELDING PIPES, COMPRISING PROXIMITY SENSORS OF SIGNAL EMISSION TYPE

[75] Inventor: Paolo Bosio, Torre Boldone, Italy

[73] Assignee: PSI Pipeline Services, S.A., Lugano, Switzerland

[21] Appl. No.: 09/011,149

[22] PCT Filed: Jul. 31, 1996

[86] PCT No.: PCT/EP96/03367

§ 371 Date: Jan. 30, 1998

§ 102(e) Date: Jan. 30, 1998

[87] PCT Pub. No.: WO97/05983

PCT Pub. Date: Feb. 20, 1997

[30] Foreign Application Priority Data

Aug. 10, 1995 [IT] Italy .................................. MI95U0588

[51] Int. Cl.⁷ .................................................. B23K 9/095
[52] U.S. Cl. ..................................... 228/102; 219/125.11
[58] Field of Search ........................... 219/124.34, 125.1, 219/125.11, 60 R, 60 A, 61; 228/8, 102

[56] References Cited

U.S. PATENT DOCUMENTS

| | | |
|---|---|---|
| 3,461,264 | 8/1969 | Nelson et al. . |
| 3,551,636 | 12/1970 | Nelson . |
| 4,019,016 | 4/1977 | Friedman et al. ..................... 219/60 A |
| 4,481,824 | 11/1984 | Fujimoto et al. . |
| 4,559,430 | 12/1985 | Hayakawa .......................... 219/125.11 |
| 4,665,734 | 5/1987 | Joet . |
| 5,148,000 | 9/1992 | Tews .................................. 219/125.11 |
| 5,288,005 | 2/1994 | Beakley et al. . |

FOREIGN PATENT DOCUMENTS 3335864  4/1985  Germany .

*Primary Examiner*—Clifford C. Shaw
*Attorney, Agent, or Firm*—Steinberg & Raskin, P.C.

[57] ABSTRACT

A device for internally butt-welding pipes (1), of the type comprising a support and guide frame (2) for an annular welding member rotatable coaxially to the pipes to be welded, and carrying a plurality of welding heads (4), the device comprising at least one sensor (15) connected to a unit for controlling the movement of said member and arranged to sense the presence of said heads at predetermined points. The sensor (15) comprises a first part (5) arranged to emit a signal and a second part (6) arranged to modify said signal, said two parts being provided respectively in seats (7) provided in said support and guide frame (2) and in said annular welding member (3) or vice versa, said two parts being arranged in such a manner as to remain permanently separated from each other.

6 Claims, 2 Drawing Sheets

DEVICE FOR INTERNALLY WELDING PIPES, COMPRISING PROXIMITY SENSORS OF SIGNAL EMISSION TYPE

FIELD OF THE INVENTION

This invention relates to a device for internally butt-welding pipes and, in particular, a device for internally butt-welding pipes employing a inductive sensor including a electromagnetic field generator.

BACKGROUND OF THE INVENTION

Known devices of the aforesaid type comprise electromagnetic proximity sensors. These sensors, each fixed into a suitable seat, comprise a first part with an axially movable rod, to the free end of which there is secured an idle round element. This round element is in contact with a flat lateral face of the movable annular welding member. The sensor also comprises a second part fixed in a suitable seat provided in the face of the annular member, on which face it slides together with the round element of the first part.

The second part is shaped as a small flat raised piece having its end portions inclined to smoothly join the face.

The raised piece is fixed in correspondence with one or more predetermined welding heads, the first part being fixed in predetermined positions of the frame.

When the annular welding member rotates and the round element of the first part of that sensor makes contact with the raised piece in predetermined angular positions, this causes axial movement of the rod of the first part of the sensor, with consequent sensor excitation.

Proximity sensors of the aforesaid type have been used for more than twenty years in known welding devices, and in spite of their considerable drawbacks an alternative solution has never been found.

The most frequent drawback of the aforesaid sensor is related to the fact that very frequently the second parts of the sensor become separated from the face to which they are secured or on which they move. In this respect the raised piece which forms the second part of the sensor is of relatively small dimensions and is secured to the annular member by a small screw of headless type, the free end of which must be in line with that surface of the raised piece on which the round element of the first part of the sensor makes contact.

It should also be noted that the rod comprising the round element exerts a considerable pressure on the raised pieces, the electromechanical sensors used in known devices being of the type able to be used within a very large temperature range (−40° C. to +150° C.), all the components of the first part of the sensor being suitably dimensioned for this purpose.

Consequently it frequently happens that after traversing the raised pieces a number of times, the rod of the first part detaches them displaces them or causes the screw securing the raised piece to partially emerge, this possibly resulting in an angular shift of the round element such that the sensor can no longer perfectly operate.

In the worst case, that of detachment of the raised piece, that part of the device comprising the welding heads must be completely dismantled, an operation requiring a considerable time during which the device remains inoperative.

The case of displacement of the raised pieces is much more frequent than their detachment. Generally the raised pieces have to be repositioned every 8–10 welds. It should be noted that although the repositioning of the raised pieces is not as complicated as their replacement, it still requires a considerable time as it has to be done with maximum precision.

Taking account of the fact that in a medium sized device five sensors with relative raised pieces are provided, it will be apparent that the problem caused by maloperation of the sensors represents a considerable problem which on the one hand results in long periods of device inoperability and on the other hand requires numerous spare parts to be available, this not being always possible as generally the devices operate in extreme situations and in places much out of the way.

In attempting to solve the aforesaid problems, during the last twenty years it has been sought to improve the characteristics of the screws for fixing the raised piece and to limit the force exerted by the round element on the raised piece. Satisfactory results have not however been achieved up to the present time.

OBJECTS AND SUMMARY OF THE INVENTION

An object of the present invention is to provide a welding device comprising sensors which overcome the aforelisted drawbacks and which in particular are subject to safe and reliable operation, such that their frequent replacement is no longer necessary.

A further object is to provide low-cost sensors which can also be used in known arrangements.

These and other objects, features, and advantages of the present invention will be apparent from the following description read in conjunction with the accompanying drawings.

BRIEF DESCRIPTION OF THE DRAWINGS

The present invention will be more apparent from the accompanying drawings, which are provided by way of non-limiting example and in which.

DETAILED DESCRIPTION OF THE PREFERRED EMBODIMENTS

Figure 1:
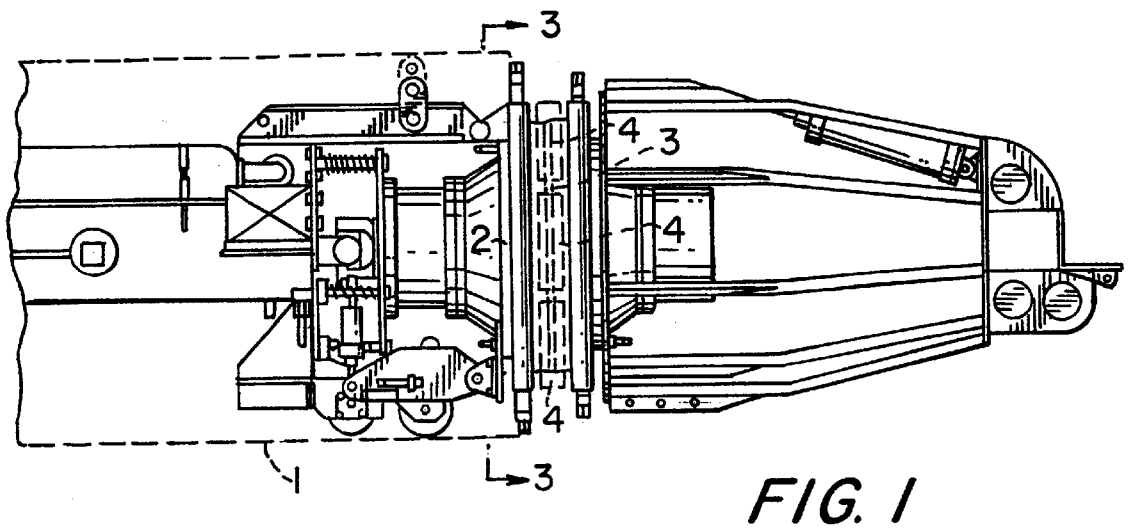
FIG. 1 is a partial schematic side view of a device according to the invention.
Figure 2:
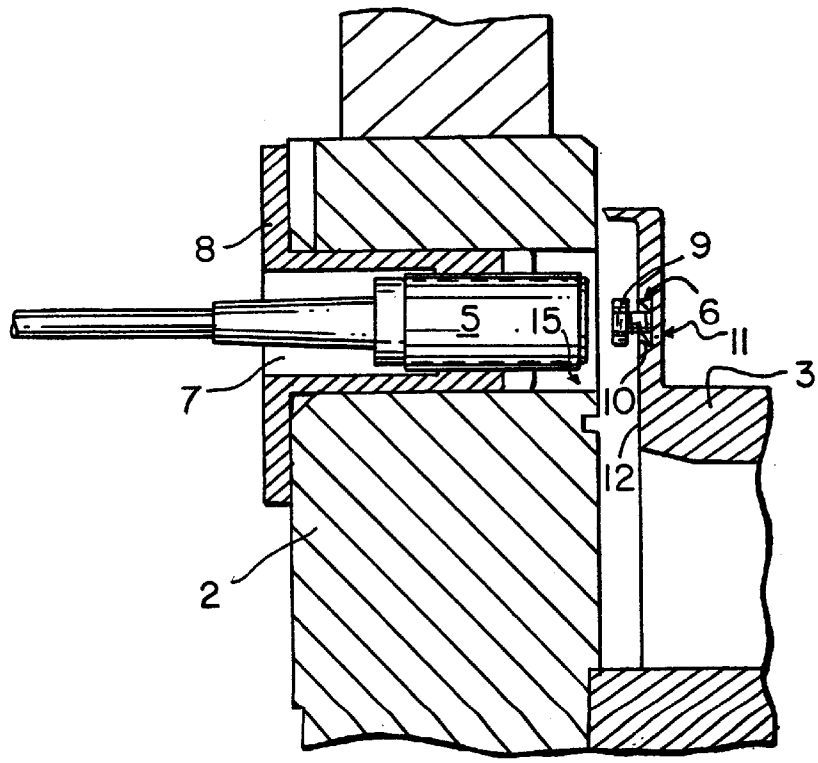
FIG. 2 is a partly sectional enlarged schematic view of a proximity sensor.
Figure 3:
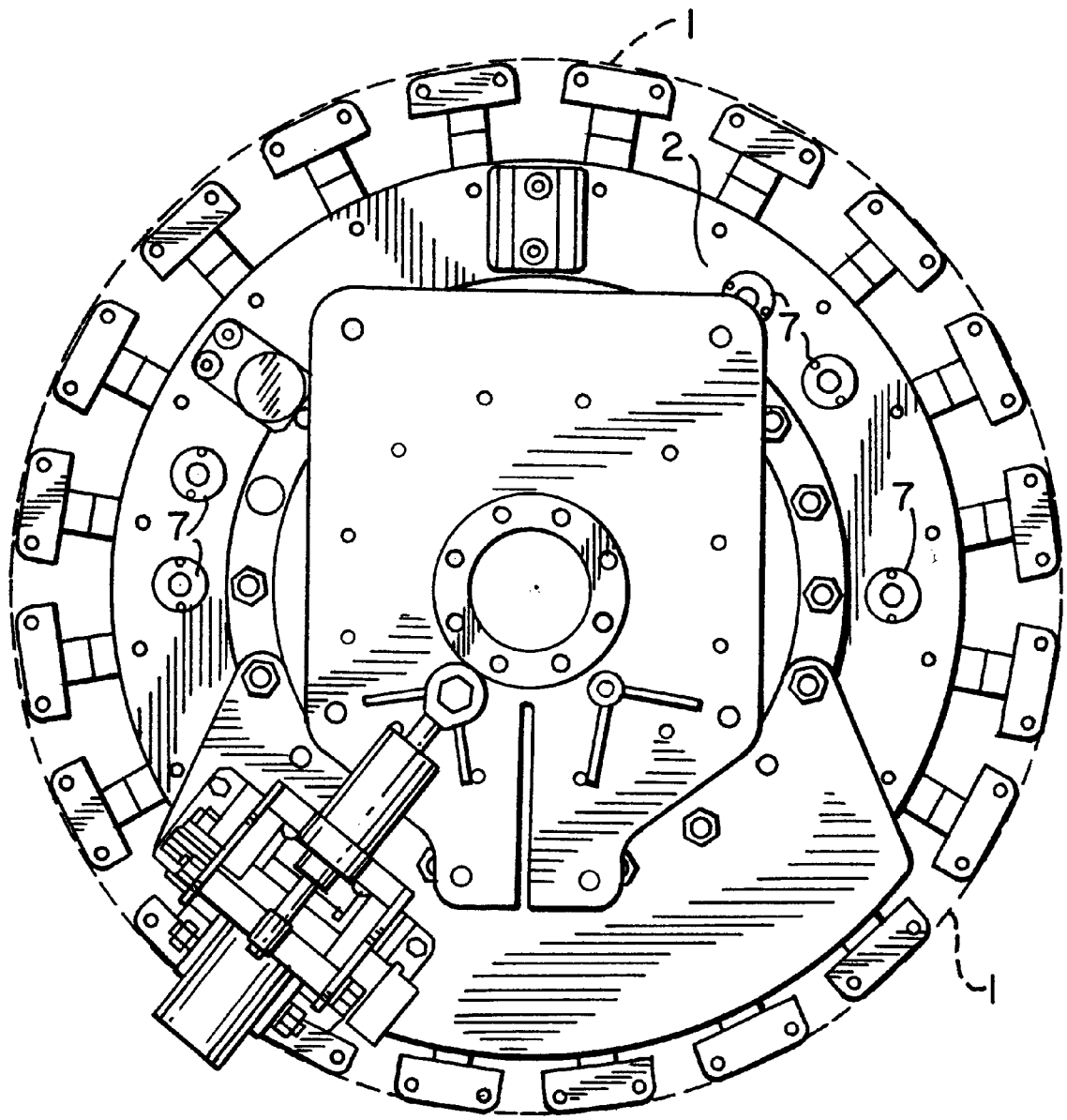
FIG. 3 is a schematic cross-section through the device taken on the line 3/3 of FIG. 1.

With reference to FIG. 1, this shows part of a device for internally butt-welding pipes 1 (only one of which is shown by dashed lines in FIGS. 1 and 3), of the type comprising a support and guide frame 2 for an annular welding member 3 rotatable coaxially to the pipes to be welded, and carrying a plurality of welding heads 4 (shown schematically only in FIG. 1). Devices of this type have been known for many years and will therefore not be described in detail hereinafter. Such devices for controlling the movement of the movable annular member 3 comprise a plurality of proximity sensors 15 arranged to sense the passage of the welding heads through determined points.

The sensors 15, which in the illustrated embodiment are five in number, comprise a first part 5 arranged to emit a signal, and a second part 6 arranged to modify said signal. The first part 5 is housed in seats 7 (FIG. 3) provided in the frame 2. The first part 5 is an inductive sensor (for example of type NJ4 SOGM-N-200 produced by the German Company PEPPERL FUCHS) able to operate within a temperature range of between −40° C. and +150° C.

The second part 6 of the sensor comprises a usual bolt 9 of ferromagnetic material, such as iron, which engages in a threaded seat in a dovetail-shaped support 10 inserted into an annular groove 11 provided in a lateral face 12 of the annular member 3. The bolt 9 can be easily located in the required position on setting up the device by sliding the support 10 within the groove 11. The movable annular member is advantageously constructed of a non-ferromagnetic material, such as aluminium or steel, and in any event of a material having magnetic characteristics different from those of the bolt 9.

On moving the annular member 3, when the bolt 9 enters the electromagnetic field generated by the part 5 of the sensor this field is varied, and a proximity signal is generated which is fed to the control unit.

It should be noted that there is no contact between the various parts of the proximity sensors provided in the device, and consequently, as has been verified experimentally, when the sensor has been positioned it remains securely fixed to the device without any possibility of its parts deteriorating or separating from the elements to which they are fixed.

Finally it should be noted that the described embodiment is provided by way of example only and that numerous modifications are possible, all falling within the same inventive concept. Instead of an inductive sensor another type of sensor not requiring contact between its various parts can be used, for example a capacitive, optoelectronic or ultrasonic sensor. Depending on the type of sensor the second part 9 would be modified in a manner obvious one skilled in the art.

I claim:

1. A device for internally butt-welding pipes, of the type comprising a support and guide frame for an annular welding member rotatable coaxially to the pipes to be welded, and carrying a plurality of welding heads, the device comprising at least one sensor connected to a unit for controlling the movement of said member and arranged to sense the presence of said heads at predetermined points, said sensor (15) comprising a first part (5) arranged to emit a signal and a second part (6) arranged to modify said signal, said two parts being provided respectively in seats (7) provided in said support and guide frame (2) and in said annular welding member (3), said two parts being arranged in such a manner as to remain permanently separated from each other, said sensor (15) being of inductive type, the first part (5) of the sensor comprising an electromagnetic field generator, the second part of the sensor and the member (3) or the support and guide element in which said second part (6) is housed being constructed of materials the magnetic characteristics of which are different from each other.

2. A device as claimed in claim 1, wherein the second part (6) is constructed of ferromagnetic material and is removably connected to the welding member (3).

3. A device as claimed in claim 1, wherein the welding member comprises in one of its lateral faces an annular groove (11) arranged to house at least one support (10) having a through threaded hole for cooperating with a bolt (9), said bolt forming the second part of the sensor (15).

4. A device for internally butt-welding pipes comprising:
   a support and guide frame for an annular welding member rotatable coaxially relative to the pipe members to be welded, said annular welding member having a body constructed from a non-ferromagnetic material and a plurality of welding heads arranged on said body;
   a control unit for controlling the movement of said annular welding member;
   at least one inductive type sensor operably connected to said control unit for sensing the presence of said heads at predetermined locations, said sensor comprising an electromagnetic field generator for emitting a signal and means for modifying said signal constructed from a ferromagnetic material, said means for modifying said signal being spaced from said electromagnetic field generator.

5. The device according to claim 4, wherein said means for modifying said signal is removably connected to the annular welding member.

6. The device according to claim 4, wherein said annular welding member comprises an lateral face having a annular groove arranged to house a support having a threaded through hole, said means for modifying said signal comprising a bolt adapted to be received within said threaded through hole.

* * * * *